United States Patent [19]

Beyer et al.

[11] Patent Number: 4,832,479

[45] Date of Patent: May 23, 1989

[54] SPECTACLE FRAME WITH RESILIENT HINGES

[76] Inventors: Karl-Heinz Beyer, 49, Av. Vaudagne, 1217 Meyrin; Conrad Zellweger, 5, ch. des Voironts, 1224 Chêne-Bougeries, both of Switzerland

[21] Appl. No.: 108,011

[22] Filed: Oct. 14, 1987

[30] Foreign Application Priority Data

Oct. 22, 1986 [CH] Switzerland .......................... 4206/86

[51] Int. Cl.[4] ........................ G02C 5/22; G02C 5/14
[52] U.S. Cl. ..................................... 351/153; 351/121; 16/228
[58] Field of Search ....................... 351/153, 121, 113; 16/228

[56] References Cited

U.S. PATENT DOCUMENTS

| 3,156,756 | 11/1964 | Seaver ................................ 351/153 |
| 3,476,466 | 11/1969 | Hopkins ............................ 351/153 |
| 4,605,293 | 8/1986 | Blumenthal ....................... 351/153 |

FOREIGN PATENT DOCUMENTS 0137885 4/1985 European Pat. Off. .
639498 11/1983 Switzerland .

Primary Examiner—Rodney B. Bovernick
Attorney, Agent, or Firm—Young & Thompson

[57] ABSTRACT

The front part (1) of the spectacle frame carries a body (10) embedded in synthetic resin, the body containing a spring (14) and a ball (15) and having legs (11) to form a hinge part. The other hinge part is solid with the arm (2) and carries a cam shape (7) provided with notches (8 and 9) for defining the folded and normal opening positions. A spacing (22) facing the front end of the arm makes it possible to unfold the latter beyond.

3 Claims, 1 Drawing Sheet

SPECTACLE FRAME WITH RESILIENT HINGES

Spectacle frames with resilient hinges are already known comprising a front part and two arms, each arm being linked to the front part by a resilient hinge making it possible to unfold the arms beyond their normal use position, each hinge comprising two parts articulated to each other by means of a pivot pin, one of said two parts being attached to the end of a metal reinforcement of the arm and having a cam shape, the other of said two parts being made in one piece and partially buried in the front part of the frame and having a cylindrical housing, at least one push-spring and one ball being lodged in said housing, said spring urging the ball against said cam shape.

In this type of frames, the hinge part which has the cylindrical housing is fixed to the arm, while the part having the cam shape is made solid with the front part of the frame. Since the part with the cylindrical housing is relatively thick, the spectacle arms look heavy from an esthetical viewpoint and this arrangement is not convenient for spectacle frames with slender arms.

Other spectacle frames are also known in which the resilient member is lodged in the front part of the frame. One such frame is disclosed, for example in Swiss Pat. No. 399,001, but the resiliency of the hinge is obtained with different means, since one part of the hinge can be displaced against the action of a spring. This type of hinge requires very precise manufacturing to avoid play and is liable to a relatively fast wear.

Still other spectacle frames are already known such as, for example, those disclosed in French Pat. Nos. 2,334,808 and 2,342,392.

The present invention has as its object to provide a precise spectacle frame making it possible to use slender arms and to unfold these arms beyond their normal opening position, while keeping the aesthetic aspect of the frame. To this end, according to this invention, there is provided a spectacle frame characterized in that said metal reinforcement exhibits a bevelled end on the side of the hinge, said end of the metal reinforcement facing a groove which is stationary in relation to the front part of the frame and being intended to engage in said groove and to strike against a wall thereof so as to define the maximum opening position of the arm.

This invention has also as its object an hinge for a spectacle frame.

The accompanying drawing shows diagrammatically by way of example several embodiments of the frame that is the object of the invention.

Figure 1:
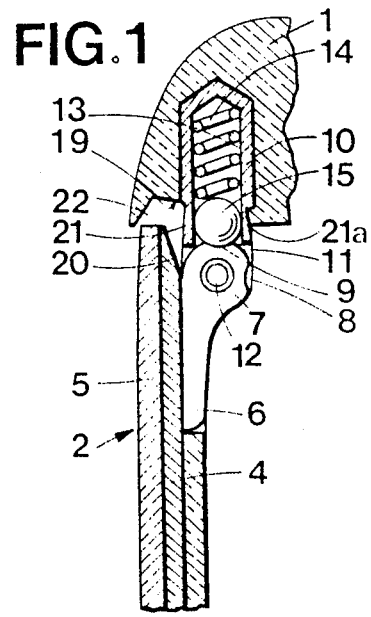
FIG. 1 is an horizontal section of one part of the frame, on the left side at hinge level.

As shown in FIG. 1, the arm 2 is formed of a metal reinforcement 4 wrapped in a synthetic resin body 5. Near its front end, the reinforcement 4 carries one hinge part 6 which is fastened to the reinforcement by welding. Part 6 exhibits a cam shape 7 provided with two notches 8 and 9. The other hinge part comprises a body 10 generally shaped as a parallelepiped of rectangular section. The body 10 comprises two legs 11 between which engages the cam shape 7 which forms the knuckle of hinge part 6. All these members 7 and 11 exhibit a central hole in which is engaged a screw 12 forming the hinging pivot pin.

Figure 2:
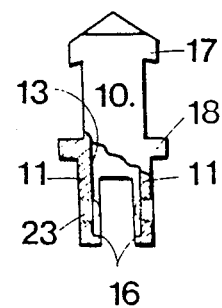
FIG. 2 is a side view of one part of the hinge.

The body 10 comprises a cylindrical housing 13 inside which are lodged a spring 14 and a ball 15. This cylindrical housing has a circular section whose diameter is bigger than the distance between the legs 11. The ball 15 bears on cam shape 7 and enters partially in notches 8 and 9 to resiliently define the folded and open positions of the arm 2. It should be noted that the open border of the cylindrical housing has been deformed at 16, as shown in FIG. 2, once the spring and the ball have been inserted, to ensure that these two elements are retained inside the housing. The deformed portion is provided on the outside end of the legs 11 and is high enough to retain the ball inside the body but of limited height so that it does not penetrate into the space between the two legs.

The body 10 is partially buried in the front part 1 of the frame where it is introduced under heating in a prepared hole of corresponding shape.

As is shown in FIG. 2, the upper and lower faces of body 10, which are perpendicular to the articulation axis of the hinge, exhibit two portions 17 and 18 projecting from the body and intended to become embedded in the front part of the frame, so as to provide an excellent anchorage.

In order to make it possible to resiliently deflect the arm beyond its normal opening position, the front part of the frame is provided with a groove 19 which faces the end of the metal reinforcement 4 of the arm. This end of the reinforcement is further provided with a bevelled edge allowing a certain amount of play between the reinforcement 4 and the body 10. The latter is equally provided with a groove 21 on its outer side face, this groove 21 being contiguous to the groove 19 of the front part of the frame. The body 10 exhibits a second groove 21a on the opposite side of groove 21, this second groove being made essentially to simplify the early stages of manufacture. In this way, the body 10 is identical for the left and right hinges right up to the stage of the machining of threaded bore 23, intended to receive screw 12. It is obvious that this groove 21a could very well be left out without prejudice to the good operation of the assembly, but its presence is quite convenient to improve the anchoring of body 10 in the front part of the frame.

The grooves 19 and 21 and the bevel 20 define a spacing 22 inside which the arm can be lodged when it is deflected beyond its normal opening position. The maximum opening position is defined by the abutment of the front end of the arm against the bottom of groove 19.

Figure 3:
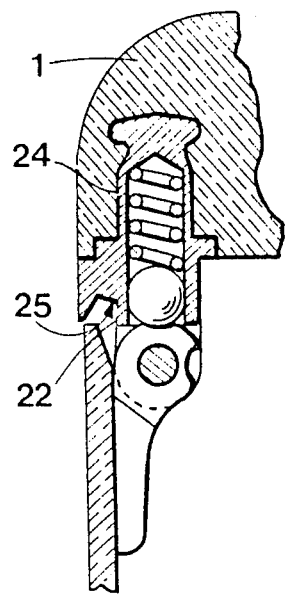
FIG. 3 is an horizontal section of the same part of the frame as in FIG. 1, according to a second embodiment of the invention.
Figure 4:
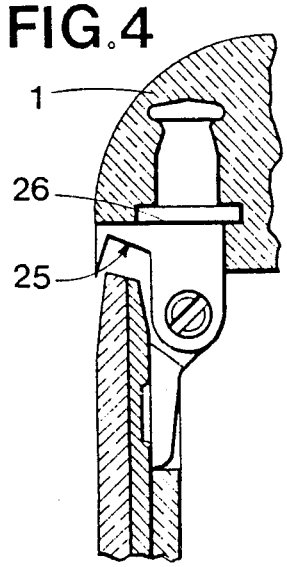
FIG. 4 is a view of this same part of the frame, according to a third embodiment of the invention.

To avoid cutting groove 19 in the front part 1 of the frame, there are provided the two embodiments of the invention shown in FIGS. 3 and 4.

In the embodiment shown in FIG. 3 and intended for a pair of spectacles with metal arms, the hinge part having the cylindrical housing and a groove 25 to receive the unfolded arm are machined in a metal part 24, thermally embedded in the front part 1 of the frame.

FIG. 4 shows an embodiment of a frame with plastic arms where the groove 25 is larger to receive the end of the arm. Part 24 has a rib 26 to ensure a good anchoring in the synthetic material of the front part 1.

We claim:

1. A resilient hinge for spectacles, said hinge comprising two parts articulated to each other by means of a pivot pin, one of said two parts being adapted to be attached to the end of a metal reinforcement of an arm of said spectacles and having a cam shape, the other of said two parts being of one piece and being adapted to be partially buried in the front part of a spectacle frame, said other part having a cylindrical housing, at least one pushspring and one ball lodged in said housing, the open end of said housing being deformed in order to keep said ball and said spring within, said spring urging said ball against said cam shape, said other hinge part having a groove formed in said other part, said groove being adapted to receive a bevelled end of said metal reinforcement to define the maximum open position of a said arm.

2. A spectacle frame comprising a front part and two arms, each arm being pivotally connected to the front part by a resilient hinge as in claim 1, said front part having also a groove that registers with said groove in said other part, said grooves together defining a spacing inside which said arm can be lodged when deflected beyond its normal opening position.

3. A spectacle frame having a front part and two arms, each arm being pivotably connected to the front part by a resilient hinge as in claim 1, said other part having a said groove on each side thereof, one said groove being adapted to receive said bevelled end of said metal reinforcement, and the other said groove being embedded in said front part.

* * * * *